April 26, 1960 L. M. MASON 2,934,280
COIL WINDING MACHINE
Filed Feb. 24, 1956 3 Sheets-Sheet 1

Inventor:
Lowell M. Mason,
by Robert G. ———
His Attorney.

April 26, 1960 L. M. MASON 2,934,280
COIL WINDING MACHINE
Filed Feb. 24, 1956 3 Sheets-Sheet 2
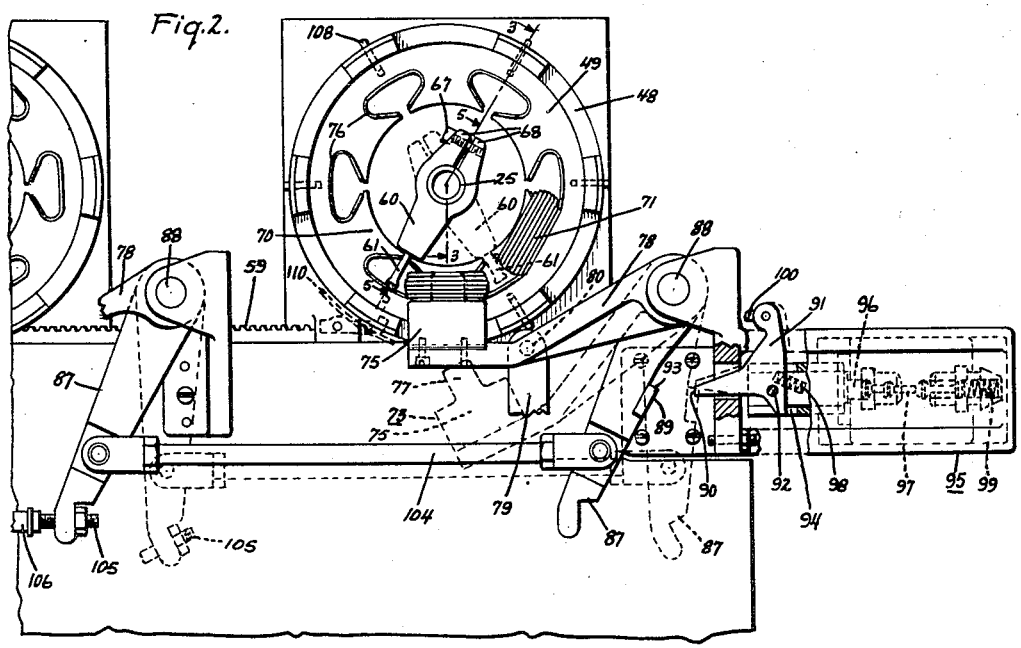
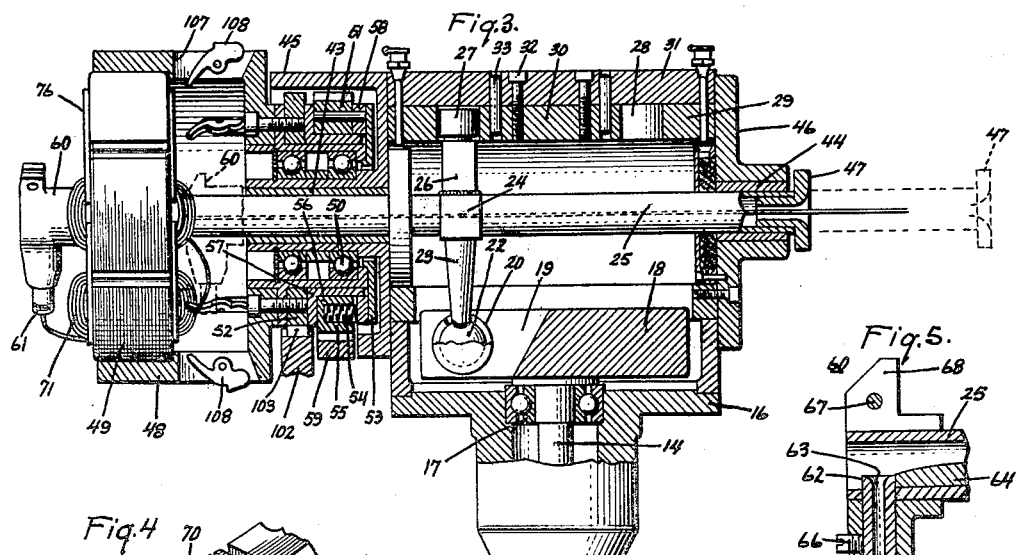
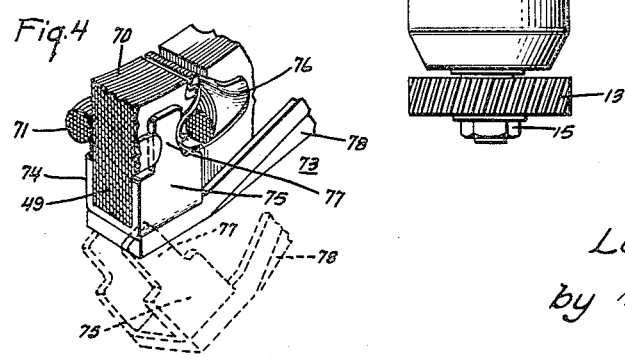
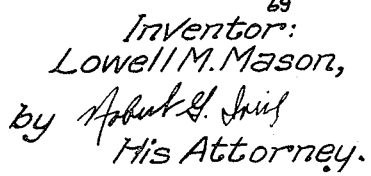
Inventor:
Lowell M. Mason,
by *Robert G. Irish*
His Attorney.

April 26, 1960 L. M. MASON 2,934,280
COIL WINDING MACHINE
Filed Feb. 24, 1956 3 Sheets-Sheet 3
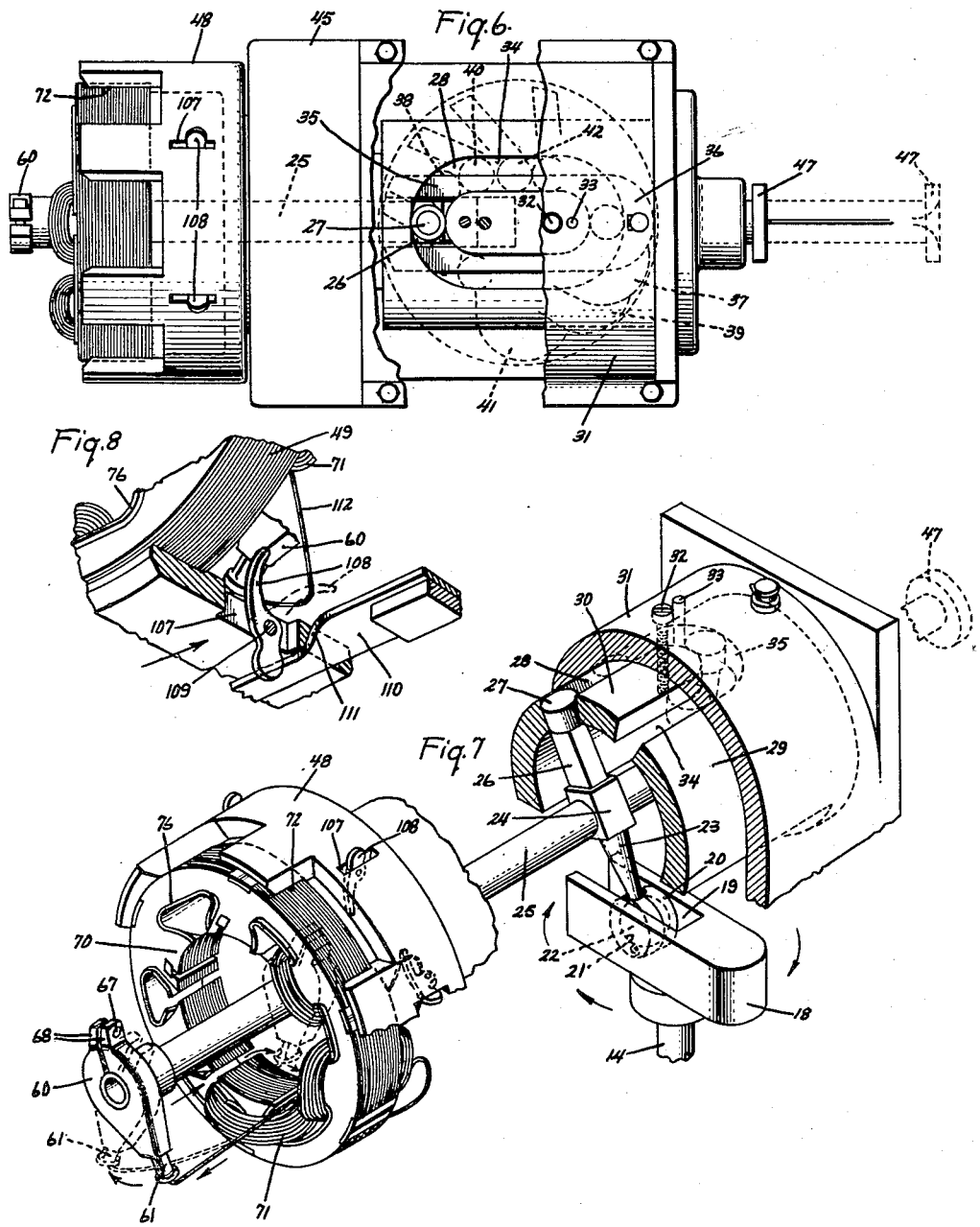
Inventor:
Lowell M. Mason,
by his Attorney.

United States Patent Office 2,934,280
Patented Apr. 26, 1960

2,934,280

COIL WINDING MACHINE

Lowell M. Mason, Fort Wayne, Ind., assignor to General Electric Company, a corporation of New York Application February 24, 1956, Serial No. 567,560

4 Claims. (Cl. 242—1.1)

This invention relates to machines for winding coils for dynamoelectric machines, and more particularly to machines which wind the coils directly into the core of the dynamoelectric machine.

There are two basically different methods of forming coils for dynamoelectric machines. In one of these the coils are wound outside the dynamoelectric machine and, once formed, are then placed into the dynamoelectric machine core. The second method is to wind the coils directly into the dynamoelectric machine core without any previous coil forming action whatsoever, thereby eliminating the need for transporting the formed coil to the core. The present invention is concerned with the improvement of machines which wind coils in the second manner, that is, directly into the core member. In machines of this type, a wire gun moves relative to the core of the dynamoelectric machine so as to feed wire into the openings in the core provided for that purpose. The output of such machines is limited by the maximum speed at which the machine can be properly operated. In the past, the relatively moving parts of the machine have been moved relatively slowly due to the fact that the weight of the moving parts was such as to create forces of a damaging nature at any higher speed. This has been particularly true in the common type of machine where the wire gun is limited to longitudinal movement, and the dynamoelectric machine core is oscillated about the gun. The weight of the core and of the portion of the machine holding it and oscillating with it is such as to constitute a severe limitation upon the speed of operation. Accordingly, it is most desirable to provide a coil winding machine, of the type which winds the coils directly into the core, which will be susceptible of high speed operation and will have a simple and economical construction involving a minimum number of parts of relatively small size and weight.

It is, therefore, an object of this invention to provide a coil winding machine which will include the advantageous features set forth above.

Further objects and advantages of this invention will become apparent and the invention will be better understood by reference to the following description and the accompanying drawings, and the features of novelty which characterize this invention will be pointed out with particularity in the claims annexed to and forming a part of this specification.

In its broader aspect, the invention provides a coil winding machine having a rotatable and longitudinally movable member with a portion arranged to feed wire into the core of a dynamoelectric machine. A cam follower, secured to the movable member at a predetermined radial distance therefrom and at a location removed from the wire feeding portion, is arranged within a cam track formed in a stationary member so as to move within the track. The movement is effected in response to movement of a motion transmitting member which is also secured to the movable member at a location removed from the wire feeding portion thereof. This motion transmitting member has a portion secured to rotary means so as to revolve therewith, and is arranged to be movable relative to the rotary means in response to movement of the follower in the track. In this manner, the movable member will have both rotary and longitudinal movement in a manner determined by the shape of the cam track. It is thus unnecessary to effect movement of the core member, and the operation may be speeded up to a considerable extent because of the simplicity and lightness of the moving parts.

In the drawings, Figure 1 is a side view of the improved machine of this invention;

Figure 2 is an end view of the improved machine;

Figure 3 is a view along line 3—3 in Figure 2;

Figure 4 is a fragmentary view in perspective showing the engagement of a part of the improved machine with a stator core member to be wound;

Figure 5 is a view along line 5—5 in Figure 2;

Figure 6 is a top view of the improved machine, partly broken away;

Figure 7 is a view in perspective of the motion transmitting arrangement and the coil forming part of the machine of the invention; and Figure 8 is a fragmentary view in perspective of a portion of the machine in cooperative relationship with a formed coil.

Figure 1:
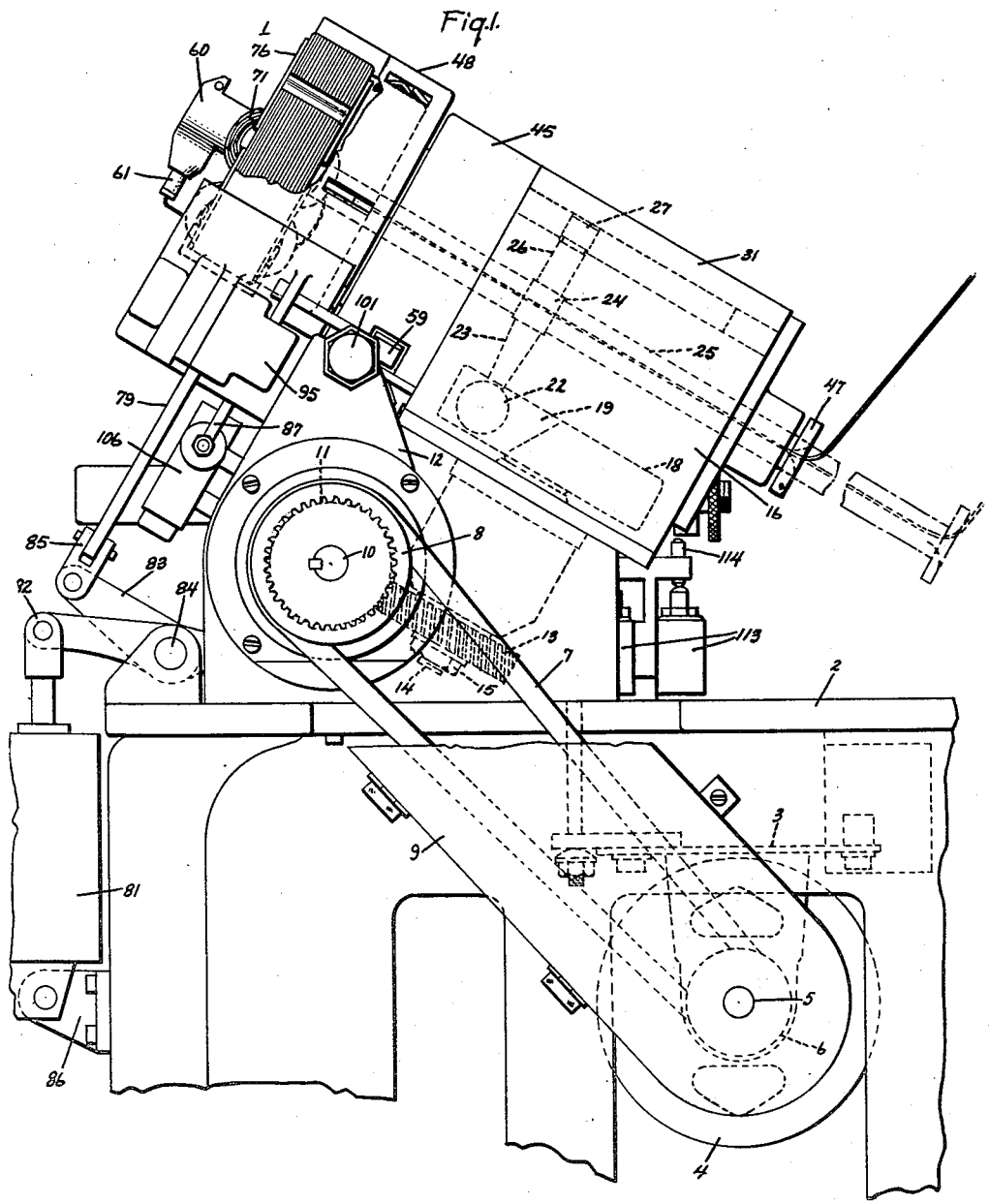

Referring now to the figures of the drawings, and particularly to Figure 1, the winding machine, generally indicated at 1, is mounted on a base 2 which has a motor support 3 secured to its underside. A motor 4 is secured to the base in any standard manner and is provided with a shaft 5 on which a pulley 6 is also mounted. Rotation of the shaft 5 causes pulley 6 to drive a belt 7 which in turn rotates a pulley 8. Pulleys 6 and 8 and belt 7 may be enclosed by a shield 9, as is well known in the art. The pulley 8 is mounted on the same shaft 10 as a helical gear 11, shaft 10 being rotatably mounted in an extension 12 of the base 2. Helical gear 11 is arranged to mesh with a driven helical gear 13 mounted on a shaft 14 and secured thereon by internally threaded member 15.

Referring now particularly to Figures 3, 6, and 7 in addition to Figure 1, shaft 14 is maintained within a stationary housing 16 in rotatable relation therewith by means of any desired bearing arrangement, such as that shown at 17. A part 18 having a substantially radial slot 19 provided therein is mounted at the end of shaft 14 so as to be rotatable therewith. A cylindrical part 20 is arranged to be movable back and forth within slot 19, and is provided with a spherical internal recess 21 in which a spherical part 22 of a motion transmitting member 23 is located. The motion transmitting member is secured by portion 24 thereof to a tube 25 which will be discussed in full detail herebelow.

The arrangement of spherical part 22 of member 23 within recess 21 of cylindrical part 20 permits the motion transmitting member 23 to be pivotable relative to the cylindrical member while, at the same time, part 22 of the motion transmitting member is caused to revolve as part 18 rotates. A second motion transmitting member 26 is also secured to tube 25 by part 24 and is provided at its end with a cam follower 27 arranged to be movable in a closed cam track 28 formed by stationary parts 29 and 30 and secured within housing portion 31 by any desired means such as bolts 32 and pins 33.

As part 18 rotates, the revolving motion of cylindrical part 20 will cause cam follower 27 to move around the cam track 28. This will, of course, cause the cylindrical part 20 to depart from a purely revolving type of motion; however, the provision of slot 19 will permit the part 20 to move longitudinally within the slot, toward and away from the axis of rotation of shaft 14, at the same time that part 18 is rotating, so as to accommodate the deviation from purely circular movement which is caused by the engagement of follower 27 within track 28. As a result, and since motion transmitting member 26 is secured to tube 25, the tube will be provided both with longitudinal movement caused by movement of follower 27 within straight portion 34 of the track 28, and with motion which is both rotary and longitudinal when follower 27 is moving within the curved portion 35 of track 28. The movement of part 18 and the consequent movement of cam follower 27 may best be seen in Figure 6, where the numeral 36 denotes part 18 when the cam follower 27 is in the position shown in solid outline, that is, on curved part 35 of cam track 28. The numerals 37 and 38 denote parts 18 and 27 respectively in a second position; the numerals 39 and 40 denote the same parts in a third position; and the numerals 41 and 42 denote the same two parts after a quarter of a revolution has been completed.

While motion transmitting members 23 and 26 have been shown as substantially a single unit at the same axial location along tube 25, it will be understood that this illustration is made purely for clarity in the description of the invention, and that, rather than constituting a single motion transmitting member, the two may be entirely separate and may be located at separate points along the axial length of the tube 25. It will also be understood that while both motion transmitting members have been shown as relatively long members arranged at right angles to tube 25, they may be of any desired shape and may be placed at any desired angle to the tube so long as the essential feature of providing parts 27 and 22 at predetermined radial distances from the tube 25 is maintained.

Referring now particular to Figure 3, tube 25 is longitudinally and rotatably mounted in a pair of bearing sleeves 43 and 44 secured respectively within housing parts 45 and 46 which are each rigidly secured to the stationary housing parts 31 and 16. The tube 25 has an eyelet 47 formed at its rear end, and is arranged to be longitudinally movable between the two extreme positions shown respectively by the solid member 47 and by the member 47 in dotted outline to the right of the solid member. A core locator member 48 is arranged to support a stator core 49 to be wound, and is rotatably mounted relative to both tube 25 and the housing assembly by means of a pair of bearings 50 mounted on housing member 45. The core locator assembly is coaxial with tube 25, and receives its motion through gear member 51 which is in frictional engagement with parts 52 and 53 of the stator locator assembly by means of a spring member 54 arranged within a recess 55 formed in the gear member. Spring 54 bears at one end against the back of the recess 56 to force that side of the gear and the bushing 57 to which it is secured against part 52, and at its other end spring 54 bears against a plate member 58 which is pinned to the gear 51 and is forced by the spring against part 53. The gear 51 is in engagement with a rack member 59 so that longitudinal motion of member 59 will cause rotation of the gear. The function of this assembly will be set forth herebelow.

A wire gun assembly 60, best seen in Figure 5, is provided at the forward end of tube 25; this assembly includes a tubular portion 61 arranged substantially perpendicular to tube 25 and having its inner end 62 positioned in a recess 63 formed in tube 25. A guide member 64 may be positioned against end 62 of tubular member 61 within tube 25 so as to provide a smoothly curving path from tube 25 into tubular member 61. Member 61 is clamped into the correct position by means of an outer part 65 secured against member 61 by a screw 66 and secured about tube 25 by means of a threaded member 67 which joins two split portions 68 of part 65 so as to tighten it about the tube 25. The wire to be used in the formation of the coils is arranged to feed into tube 25 through the opening in eyelet member 47 at the back of the tube, to extend through the tube, and to be fed out of the tube into the core member over guide member 64 and through tubular member 61.

It will be seen from the foregoing description that, as tube 25 is moved in accordance with the movement of cam follower 27 in cam track 28, the wire gun assembly 60 will move in the same manner since it is rigidly secured to the tube member. The outer end of assembly 60 is formed into an opening 69 which is radially positioned to enter the openings between the poles of member 49. The wire coming out of opening 69 of tubular portion 61 will be moved in a path substantially similar to that of the cam track since the motion of the cam track causes longitudinal and rotational motion of the tube and this in turn is imparted to the outer end of the tubular member 61. The longitudinal movement of tube 25 is so determined as to provide movement of wire gun assembly 60 for a predetermined distance more than the width of the core member being wound so that it will move from one side thereof to the other. The curved part of cam track 28 is so proportioned as to cause the proper rotational movement of tube 25 and wire gun assembly 60 so that the assembly 61 will carry the wire entirely across the width of a pole 70 before passing back through the core member. In this manner, the wire will be caused to move around a pole each time cam follower 27 makes a complete trip around cam track 28 so as to form a coil 71. Thus, the only moving parts of the machine engaged in the actual winding operation are the tube 25 and the wire gun assembly 60 which are both relatively small like parts and therefore may be moved extremely fast so as to perform the winding operation speedily and effect a substantial economy.

In order to maintain the core member 49 rigidly secured within locator member 48 during the winding operation, a plurality of recesses 72 coinciding substantially with the poles 70 of the core are provided in locator member 48, and a clamping assembly, generally indicated at 73, and best seen in Figures 2 and 4, is arranged to move up into engagement with the core member 49 in a recess 72 (Figure 6). Each recess is somewhat deeper than the width of the core member 49 so that the rear portion 74 of clamping assembly 73 as well as the front portion 75 will be movable into engagement with a face of the core. Another purpose of clamping assembly 73 is to provide the requisite added rigidity to the insulation 76 provided between the poles; this is desirable because of the fact that the wire is pulled over the insulation and may crush it against the edge of the core during the winding operation, thereby possibly damaging the insulation of the wire, unless additional strength is provided to the insulation 76. Portion 77 of clamping assembly 73 achieves this effect by fitting between each two insulation pieces 76 so as to back them up, in effect, and thereby strengthen them so that they will not deform during the winding operation. Parts 74 and 75 are secured to an arm 78 which is actuated by means of a link 79 pivotably secured to arm 78 by pin 80. As may be seen in Figure 1, link 79 is actuated by an air cylinder 81 through piston arm 82, link 83 pivoted at 84, and link 85. Cylinder 81 may be pivotably arranged on extension 86 of the base in order to provide for the slight rotational movement that will be occasioned because of the movement of link 83 about pin 84.

An arm 87 is formed integrally with arm 78; the two arms are pivotably mounted on pin 88, and arm 87 is provided with a surface 89 arranged to engage the end 90 of a member 91 pivotably mounted on pin 92. At the end of surface 89 there is a notch 93 provided for a purpose which will appear herebelow. Pin 92 is slidably mounted in housing part 94 of a valve assembly 95 having a valve stem 96 and a valve seat assembly generally indicated at 97. The valve assembly 95 is also provided with a spring member 98 which acts against member 91 so as to bias it in a counterclockwise direction about pin 92. In addition, the valve stem 96 is biased to the left, through assembly 97, as seen in Figure 2, by means of spring 99.

Before a winding operation on a pole 70, the clamping assembly 73 is in the position shown in dotted outline in Figure 2, with arm 87 also being as shown by the dotted outline. In this position, surface 89 is in engagement with end 90 of member 91, and the member 91 is then pushed to the right against the action of spring 99 to cause actuation of the valve 95. Actuation of this valve operates cylinder 101 in Figure 1 (by standard connections not shown) and the cylinder actuates rack member 59 (also by standard connections which are not shown); through gear 51, the rack member indexes the core 49 around until the next unwound pole 70 is in position to have a coil wound thereon by wire gun assembly 60.

When the rack reaches its end position, it moves into engagement with button 100 of member 91 to move the member clockwise about pin 92 against the action of spring 98. This moves end 90 of member 91 upwardly so that it falls in the notch 93 above surface 89 of arm 87. Spring 99 then moves the valve 95 to a second position so that the feed to cylinder 101 is reversed (by standard connections not shown) and rack member 59 is moved back to its starting position. As can be seen in Figure 3, a pawl 102 is arranged in engagement with a ratchet member 103 formed on member 52. The pawl permits the frictional engagement of gear member 51 to move the stator locator assembly 48 during the indexing movement of the rack, but, by engaging the ratchet member, maintains the locator assembly in the desired position as the rack is moved back, with gear 51 slipping relative to the remainder of the assembly. In this manner, the locator assembly is positively precluded from undesired reverse movement after the indexing has been effected. At the end of its backward stroke, the rack engages any desired means (not shown) to permit operation of air cylinder 81 to cause link 79 to move the insulator clamp assembly 73 back into engagement with the stator core in position for the new pole to be wound.

The illustrated embodiment of the invention shows, particularly in Figure 2, that the machine is not limited to a single winding unit, but that plural winding units may be arranged together in one machine with considerable simplicity, with the rack 59 performing the desired operation for both units, and with a connecting link 104 between the two arms 87 so as to cause synchronized movement thereof. A threaded member 105 is connected to one of the arms 87, and is arranged to engage a limit switch 106 which (by any desired connection) causes motor 4 to be operatively connected to tube 25.

Referring now to Figures 2, 3, and 8 in particular, the core locator assembly 48 is provided with a plurality of circumferentially spaced recesses 107, with a hook member 108 being pivotably mounted on a pin 109 within each recess. The hook members are so positioned in the core locator assembly 48 as to lie circumferentially between each two poles 70. At the end of each coil winding operation, the wire gun assembly stops in the position shown in dotted outline in Figure 3. It will then be seen that, as the core locator assembly 48 is indexed after the winding operation on a pole is complete, wire will be pulled out of the assembly 60. Because of the rotation of the core member during the indexing, the wire will form a chord across the bore of core member 49 and will thus interfere with subsequent assembly of the motor, and with operation thereof, unless the situation is corrected. To correct this situation, the pivotable hook members 108 have been provided. A cam member 110 is immovably provided in the position shown in Figures 2 and 8 so as to cooperate with each hook member 108 as it is indexed into engagement therewith. The portion 111 of the cam member 110 causes the hook member to pivot in a clockwise direction, as seen in Figure 8, to the position shown in dotted outline. The wire 112 which extends between the last formed coil and the wire gun is then forced to pass around hook 108 in the position shown in dotted outline, and this provides enough length in the wire so that it may be tucked back and cannot interfere with motor operation by chording across the bore of the core member. The fact that a hook member 108 is positioned between each two poles 70 will cause a suitable loop of wire 112 to be formed between each two coils 71 wound on the poles.

The operation of the machine will now be briefly described. A stator core 49 having salient poles 70 which are to have coils wound thereon is positioned in the core locator assembly 48 as previously described. At this time, the wire gun assembly 60 is in the position shown in dotted outline in Figure 3. The insulator clamp assembly 73 is then positioned as shown by the solid lines in Figure 4, and switch 106 is actuated so that the rotation of motor 4 will be transmitted to part 18. There will then follow the sequence of movement previously described whereby the wire gun moves about the salient pole because of the longitudinal and rotary motion of tube 25. The motion of part 18 and the consequent motion of the wire gun assembly 60 are shown by arrows in Figure 7. The winding action continues for a predetermined interval until one of two limit switches 113 (Figure 1), depending on the direction of rotation of the motor, is operated by a timer mechanism such as that shown at 114 to break the connection to the motor 4.

Limit switches 113 also cause actuation (by any desired standard means, not shown) of air cylinder 81 which operates link 79 to pull insulator clamp assembly 73 out of engagement with the core. This action in turn causes the valve 95 to actuate the rack 59, as previously described, and rack 59 cooperates with gear 51 to index the core locator assembly 48 and the core member 49 to a position where another pole is in position to be wound by wire gun 60. During the indexing, a hook 108 will be moved outwardly by camming member 110, as previously described, to provide the necessary slackness in the wire to prevent it from chording across the bore of the core. As the rack 59 reaches its extreme position, it engages button 100 which in turn permits another movement within valve 95 to cause the rack to return to its previous position. This causes engagement of the rack with any desired switch means (not shown) to actuate cylinder 81 and return the insulator clamp assembly 73 to its position of engagement with the core 49 to be wound. Return of assembly 73 causes arm 87 to move threaded member 105 into engagement with switch 106 to renew the connection of motor 4 to shaft 14 and thereby start a coil winding operation. It will be understood that any desired means may be provided to stop this automatic action after all the poles have been wound, so that the wound core may be removed and a new core to be wound inserted in its place.

It will be seen from the foregoing description that the invention provides a machine for winding coils directly into a dynamoelectric machine core whereby the only moving parts involved in the coil forming operation are small and relatively light and thus may be moved at a considerably greater speed than would otherwise be possible thereby permitting the coils to be formed faster. In addition, it will be seen that the machine includes a relatively small number of parts of relatively simple design and that, therefore, in addition to the economy effected in the operation of the machine, such a machine will be most economical to manufacture.

While the invention has been explained by describing a particular embodiment thereof, it will be apparent that improvements and modifications may be made without departing from the scope of the invention as defined in the appended claims.

What I claim as new and desire to secure by Letters Patent of the United States is:

1. A coil winding machine comprising a tube member mounted for rotational and longitudinal movement, a wire gun assembly rigidly secured to said tube member, said tube member and said assembly having openings arranged in cooperative relationship with each other to provide a passage for wire to be fed through said tube member and said assembly into the core of a dynamoelectric machine, a cam follower member secured to said tube member at a predetermined radial distance therefrom and at a location axially removed from said wire gun assembly, a stationary member including a cam track having a pair of axially aligned straight portions arranged parallel to said tube member and a pair of curved portions connecting the respective ends of said straight portions to form a closed track, a motion transmitting member secured to said tube member at a location axially removed from said wire gun assembly, and rotary means including a member having a radial slot formed therein, said motion transmitting member having a portion movably secured within said slot so as to rotate with said member of the rotary means and to slide radially toward and away from the axis of rotation of said rotary means during operation of said rotary means thereby producing a controlled longitudinal and rotational movement of said tube member.

2. In a coil winding machine, a rotatable longitudinally movable member having a section arranged to feed wire into the core of a dynamoelectric machine, rotary driving means having a rotatable radially extending member, and motion translating and connection means for driving said movable member with said rotary driving means to move said movable member in a predetermined path, said motion translating and connection means comprising a stationary member including a cam track, a cam follower member secured to said movable member at a predetermined radial distance therefrom axially removed from said section and arranged to move within said cam track, and a motion transmitting member having a first portion secured to said movable member at a location axially removed from said section and having a second portion movably attached to said radially extending member for rotation therewith and for radial movement toward and away from the axis of rotation of said rotary driving means in response to the movement of said follower in said track thereby producing a controlled longitudinal and rotational movement of said movable member.

3. In a coil winding machine, a rotatable longitudinally movable member having a section arranged to feed wire into the core of a dynamoelectric machine, rotary driving means including a rotatable radially extending member having a radial slot formed therein, and motion translating and connection means for driving said movable member with said rotary driving means to move said movable member in a predetermined path, said motion translating and connection means comprising a cam track having a pair of relatively straight portions extending substantially parallel to said movable member and a pair of curved portions joining the ends respectively of said straight portion, a cam follower member secured to said movable member at a predetermined radial distance therefrom axially removed from said section and arranged to move within said cam track, and a motion transmitting member having one end thereof secured to said movable member at a location axially removed from said section and having the other end formed with a substantially spherical portion received within said radial slot for rotation with said radially extending member and for radial and pivotal movement toward and away from the axis of rotation of said radially extending member during operation of said rotary driving means thereby producing a controlled longitudinal and rotational movement of said movable member.

4. In a coil winding machine, a tube member mounted for rotatable and longitudinal movement, a wire gun assembly mounted on said tube adjacent an end thereof, said tube member and said assembly being formed with communicating openings to form a continuous passage for the feeding of wire into the core of a dynamoelectric machine, rotary driving means including a rotatable radially extending member having a radial slot therein, and motion translating and connection means for driving said tube member with said rotary means to move said wire gun assembly in a predetermined path, said motion translating and connection means comprising a stationary member including a closed cam track having a pair of relatively straight portions arranged substantially parallel to said tube and having a pair of curved portions respectively joining the ends of said straight portions, a cam follower member secured to said tube member at a predetermined radial distance therefrom axially removed from said wire gun assembly and arranged to move within said cam track, and a motion transmitting member having one end thereof secured to said tube member at a location axially removed from said wire gun assembly and having the other end formed with a substantially spherical portion, an intermediate member slidably received within said radial slot of the radially extending member, said spherical portion pivotally connected to said intermediate member for rotational and radial movement with said intermediate member toward and away from the axis of rotation of said radially extending member during operation of said rotary driving means thereby producing a controlled longitudinal and rotational movement of said tube member.

References Cited in the file of this patent

UNITED STATES PATENTS

| | | |
|---|---|---|
| 126,052 | Harrison | Apr. 23, 1872 |
| 872,875 | Wiegant | Dec. 3, 1907 |
| 1,431,947 | Gysel | Oct. 17, 1922 |
| 1,595,396 | Herrick | Aug. 10, 1926 |
| 1,977,828 | Laib et al. | Oct. 23, 1934 |
| 2,304,520 | Wirtz et al. | Dec. 8, 1942 |
| 2,632,602 | Weis | Mar. 24, 1953 |
| 2,640,652 | Harvey | June 2, 1953 |
| 2,770,424 | Grove | Nov. 13, 1956 |
| 2,791,121 | Morrill | May 7, 1957 |